(12) United States Patent
He et al.

(10) Patent No.: US 10,908,408 B2
(45) Date of Patent: Feb. 2, 2021

(54) PIXEL STRUCTURE, METHOD FOR MANUFACTURING PIXEL STRUCTURE ARRAY SUBSTRATE, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Wei He, Beijing (CN); Wenqiang Chen, Beijing (CN); Shi Cheng, Beijing (CN); Jiao Fang, Beijing (CN); Xinghua Li, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 237 days.

(21) Appl. No.: 16/118,908

(22) Filed: Aug. 31, 2018

(65) Prior Publication Data
US 2019/0204581 A1  Jul. 4, 2019

(30) Foreign Application Priority Data
Jan. 3, 2018  (CN) .......................... 2018 1 0004277

(51) Int. Cl.
*G02B 26/00*  (2006.01)

(52) U.S. Cl.
CPC .................................. *G02B 26/001* (2013.01)

(58) Field of Classification Search
CPC .. G02B 26/001; G02B 26/02; G02B 26/0841; G02B 26/0833; G02B 2006/12104; G02B 26/085; G02B 26/0858
See application file for complete search history.

(56) References Cited

U.S. PATENT DOCUMENTS

| 5,638,084 | A | * | 6/1997 | Kalt | G09F 9/372 345/31 |
| 6,040,937 | A | * | 3/2000 | Miles | B82Y 20/00 359/291 |
| 7,365,897 | B2 | * | 4/2008 | Hagood | G02B 6/0043 359/198.1 |
| 7,521,666 | B2 | * | 4/2009 | Tsang | G02B 5/282 250/226 |

(Continued)

*Primary Examiner* — Collin X Beatty
(74) *Attorney, Agent, or Firm* — Calfee, Halter & Griswold LLP (57) ABSTRACT

The present disclosure provides a pixel structure, a method of driving a pixel structure, an array substrate, and a display device. The pixel structure includes a fixed substrate, an electrically conductive layer at a side of the fixed substrate, a movable shield at another side of the fixed substrate, and an electrically conductive film. The fixed substrate includes a transparent substrate and a dielectric layer. The electrically conductive layer and the dielectric layer are configured to form one or more interference air gaps according to a pixel voltage applied between the electrically conductive layer and the electrically conductive film. The movable shield is configured to change an amount of incident light irradiating the electrically conductive layer.

16 Claims, 3 Drawing Sheets

(56) References Cited

U.S. PATENT DOCUMENTS

| | | | |
|---|---|---|---|
| 7,642,127 B2* | 1/2010 | Floyd | B81C 1/00269 257/E21.007 |
| 8,130,440 B2* | 3/2012 | Kothari | G02F 1/13306 136/246 |
| 9,726,913 B2* | 8/2017 | Marino | G02F 1/015 |
| 2003/0043157 A1* | 3/2003 | Miles | G02B 6/1225 345/540 |
| 2004/0240032 A1* | 12/2004 | Miles | G02F 1/19 359/291 |
| 2014/0354601 A1* | 12/2014 | Bita | G02B 6/0055 345/175 |

\* cited by examiner

PIXEL STRUCTURE, METHOD FOR MANUFACTURING PIXEL STRUCTURE ARRAY SUBSTRATE, AND DISPLAY DEVICE

CROSS REFERENCE TO RELATED APPLICATIONS

The present application claims the priority of Chinese patent application No. 201810004277.X, filed on Jan. 3, 2018, the content of which is incorporated herein by reference in its entirety.

TECHNICAL FIELD

The present disclosure relates to the field of display, and in particularly to a pixel structure, a method for driving a pixel structure, an array substrate, and a display device.

BACKGROUND

MEMS (Micro Electro Mechanical System, MEMS) and IMOD (Interferometer Modulator) technology can be used in display technology. The displayed gray level can be adjusted by controlling the addressing units which can be driven independently. However, this display adjustment method has a very high requirement to the manufacturing accuracy of the display device.

SUMMARY

According to an aspect of the present disclosure, there is provided a pixel structure, comprising a fixed substrate, an electrically conductive layer at a side of the fixed substrate, a movable shield at another side of the fixed substrate, and an electrically conductive film. The fixed substrate comprises a transparent substrate, and a dielectric layer. The electrically conductive layer and the dielectric layer are configured to form one or more interference air gaps according to a pixel voltage applied between the electrically conductive layer and the electrically conductive film. The movable shield is configured to change an amount of incident light irradiating the electrically conductive layer.

In an embodiment, the electrically conductive film is between the electrically conductive layer and the transparent substrate, and the dielectric layer at least partially surrounds the electrically conductive film.

In an embodiment, a height of the interference air gap in a direction perpendicular to the fixed substrate is $$\frac{1}{2}n\lambda,$$

wherein λ is a wavelength corresponding to a color of a sub-pixel of the pixel structure and n is a positive integer.

In an embodiment, the movable shield is configured to change the amount of the incident light irradiating the electrically conductive layer by moving in a plane parallel to an extending direction of the fixed substrate.

In an embodiment, the pixel structure further comprises a driving mechanism. The driving mechanism comprises a driving member, and an elastic member and a load member connected to the movable shield. The driving mechanism is configured to drive the movable shield to move a preset distance in the plane parallel to the extending direction of the fixed substrate according to a driving voltage applied between the driving member and the load member.

In an embodiment, the electrically conductive layer comprises a flexible reflective film and a rigid layer. The flexible reflective film and the dielectric layer are configured to form the interference air gap according to the pixel voltage, and the rigid layer is configured to define the height of the interference air gap in the direction perpendicular to the fixed substrate.

In an embodiment, an antireflective coating and an absorbing layer are disposed in parallel in the dielectric layer, and the absorbing layer is closer to the electrically conductive layer than the antireflective coating.

In an embodiment, the electrically conductive film is sandwiched between the absorbing layer and the antireflective coating.

In an embodiment, the one or more interference air gaps comprise three interference air gaps, and each of the interference air gaps has a different height in a direction perpendicular to the fixed substrate.

In an embodiment, the movable shield is a total reflective mirror.

In an embodiment, a material of the fixed substrate is a light-transmissive material.

In an embodiment, the electrically conductive layer comprises a plurality of segments, each of which respectively forms one of the interference air gaps with the dielectric layer, and a light-transmissive gap exists between the segments.

According to another embodiment of the present disclosure, there is provided an array substrate comprising the pixel structure of the above embodiments.

According to yet another embodiment of the present disclosure, there is provided a display device comprising the array substrate of the above embodiments.

In an embodiment, the display device further comprises a light-sensitive device configured to generate an ambient light signal, and a controller able to receive the ambient light signal. The controller is configured to control the movable shield to change the amount of the incident light irradiating the electrically conductive layer according to the ambient light signal.

In an embodiment, the movable shield is configured to enable the display device to enter a reflective display mode, a transmissive display mode or a half-transmissive-half-reflective display mode.

According to still another embodiment of the present disclosure, there is provided a method for driving a pixel structure. The pixel structure comprises a fixed substrate, an electrically conductive layer at a side of the fixed substrate, a movable shield at another side of the fixed substrate, and an electrically conductive film. The fixed substrate comprises a transparent substrate, and a dielectric layer. The electrically conductive layer and the dielectric layer are configured to form one or more interference air gaps according to a pixel voltage applied between the electrically conductive layer and the electrically conductive film. The movable shield is configured to change an amount of incident light irradiating the electrically conductive layer. The method comprises:

disconnecting the pixel voltage such that the one or more interference air gaps are formed between the electrically conductive layer and the dielectric layer; and driving the movable shield to move a preset distance in a plane parallel to an extending direction of the fixed substrate to change the amount of the incident light irradiating the electrically conductive layer.

In an embodiment, the method further comprises:

before the step of driving the movable shield to move the preset distance in the plane parallel to the extending direction of the fixed substrate to change the amount of the incident light irradiating the electrically conductive layer, obtaining an ambient light signal; and the step of driving the movable shield to move the preset distance in the plane parallel to the extending direction of the fixed substrate to change the amount of the incident light irradiating the electrically conductive layer comprises: driving the movable shield according to the ambient light signal to move the preset distance in the plane parallel to the extending direction of the fixed substrate to change the amount of the incident light irradiating the electrically conductive layer.

BRIEF DESCRIPTION OF DRAWINGS

These and other aspects of the invention are apparent from and will be further elucidated, by way of example, with reference to the drawings, in which.

DETAILED DESCRIPTION

The embodiments of the present disclosure are described in detail below. Examples of the embodiments are illustrated in the drawings, in which the same or similar reference numerals are used to refer to the same or similar elements or elements having the same or similar functions throughout the drawings. The embodiments described below with reference to the accompanying drawings are illustrative. They are only used to explain and not to limit the present disclosure MEMS (Micro Electro Mechanical System) is a micro system designed and manufactured based on, but not limited to, an IC process. It integrates electronic devices and mechanical members in a single body. Its internal structure is generally on the order of micrometers or even nanometers, and is an independent intelligent system. With the development of MEMS technology and the significant reduction in cost and power consumption, display products based on MEMS technology have been rapidly developed. More than 80% of digital cinemas worldwide use this technology. MEMS display devices are now evolving toward smaller form factors, lower power consumption, and higher resolution, so that any surface can be converted to a high definition display. Light can be well modulated and manipulated by using MEMS micro-optics. MEMS-based display technology has grown considerably since the 1980s, including, for example, DLP (Digital Light Procession) which is based on DMD devices (Micro Mirror devices), Large GxL laser projector which is based on GLV (Grating Light Valve).

IMOD (Interferometer Modulator) technology is a reflective display technology. Even under the irradiation of the sun, it can make the image of the monitor clear and sharp. Its process of displaying color is the same as the principle of the butterfly wings shining. Display devices based on IMOD technology do not require a backlight. Compared to other display technologies, it has significant low power consumption and can significantly extend the battery life of the device.

Figure 1:
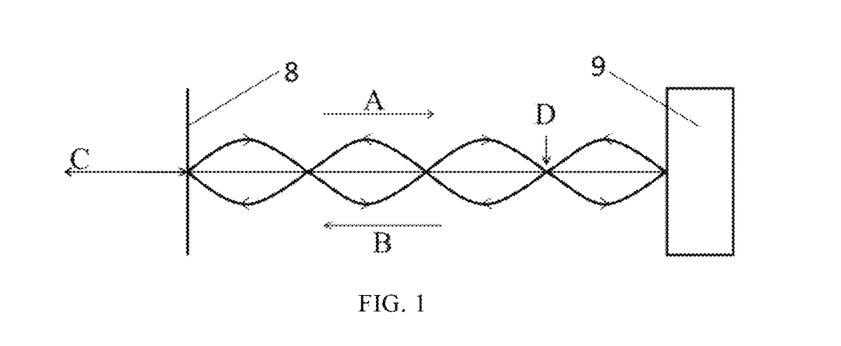
FIG. 1 schematically shows the principle of forming interference light by constructive interference.
Figure 2:
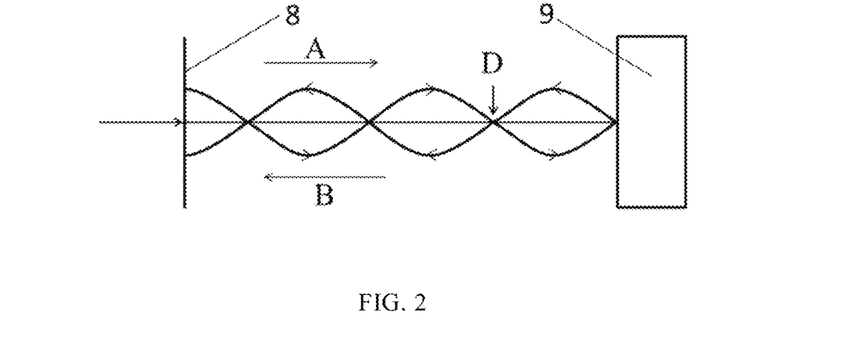
FIG. 2 schematically shows the principle of preventing light emission by destructive interference.

The related IMOD technique primarily utilizes two lenses (such as the lens 8 and the reflective mirror 9 in FIGS. 1 and 2) to form a tiny resonant cavity. The incident light A and the reflected light B reflected by the reflective mirror 9 form standing wave interference of light of different wavelengths by means of the resonant cavity. By adjusting the distance between the lens and the reflective mirror, interference lights C of different colors can be produced. As shown in FIG. 1, when the lens 8 on the left is positioned at the wave node D of the incident light A and the reflected light B, the incident light A forms structural interference with the reflected light B. In that situation, the interference light C can exit the lens 8, and the pixel point is bright. When the incident light is white light, light of specific color can be enabled to exit according to the distance between the left and right surfaces of the cavity. As shown in FIG. 2, when the lens 8 is not at the wave node D of the incident light A and the reflected light B, the incident light A forms a destructive interference with the reflected light B. In this situation, the interference light C cannot pass through the lens 8, and the pixel point will become black.

Gray level refers to the level of shade (grayscale). For example, to adjust the grayscale of a sub-pixel, the sub-pixel can be divided into a plurality of addressable units which can be independently driven. The ideal gray level can be obtained by a combination of different addressable units. However, this gray level adjustment depends on the number of the addressable units. Therefore, the number of gray levels of the gray scale is limited, and the requirement of the accuracy of manufacture of the display device is very high.

Figure 3:
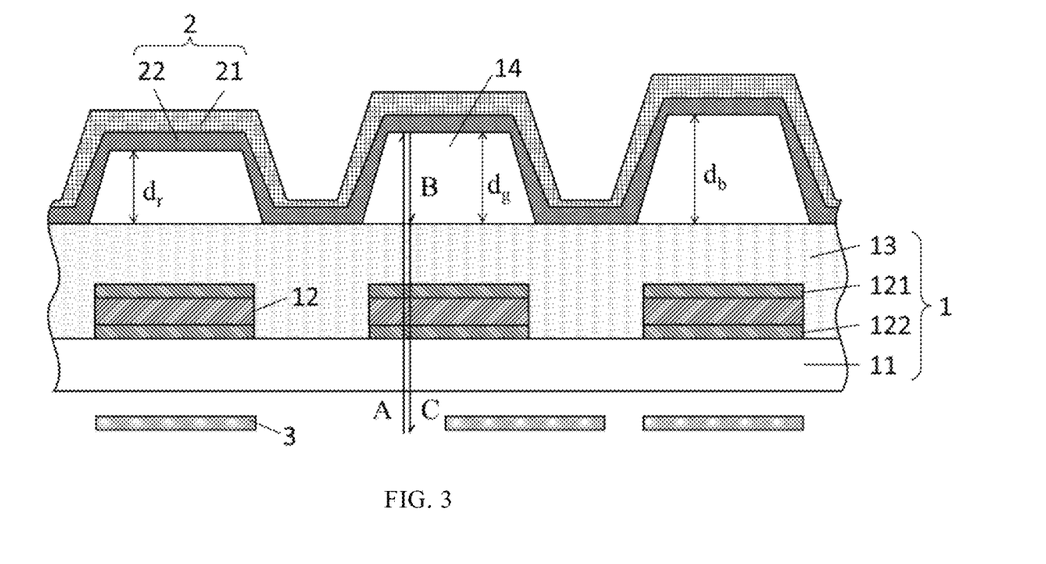
FIG. 3 schematically illustrates a schematic diagram of a pixel structure in accordance with an embodiment of the present disclosure.

The present disclosure provides a pixel structure. FIG. 3 schematically illustrates the structure of the pixel structure in accordance with an embodiment of the present disclosure. The pixel structure comprises a fixed substrate 1, an electrically conductive layer 2, a movable shield 3, and an electrically conductive film 12. The fixed substrate 1 comprises a transparent substrate 11 and a dielectric layer 13 provided on the transparent substrate 11. The present disclosure does not limit the position of the electrically conductive film 12. Although in FIG. 3, the electrically conductive film 12 is located between the electrically conductive layer 2 and the movable shield, and is partially surrounded by the dielectric layer 13, the electrically conductive film 12 may be located elsewhere as long as the electrically conductive film 12 can cooperate with the electrically conductive layer 2, so that the electrically conductive layer 2 can be deformed in a direction perpendicular to the fixed substrate 1. For example, in an embodiment, the electrically conductive film 12 can be located on a side of the electrically conductive layer 2 away from the fixed substrate 1. The movable shield 3 may be configured to make a portion of the incident light A to irradiate the electrically conductive layer 2 by a preset movement, and another portion of the incident light A to be blocked. The manners of the movement are not limited. For example, in an embodiment, the movable shield 3 is movable in a plane parallel to the fixed substrate 1 to change the amount of incident light irradiating the electrically conductive layer 2.

The electrically conductive layer 2 is disposed on a side of the electrically conductive film 12 away from the transparent substrate 11. An interference air gap 14 can be formed between the electrically conductive layer 2 and the dielectric layer 13 in response to a pixel voltage applied between the electrically conductive layer 2 and the electrically conductive film 12. In the pixel structure, each sub-pixel corresponds to an interference air gap 14. The height of the interference air gap is related to the principle of light emission. Specifically, if a light of a certain color is desired to interfere constructively by the reflection on the upper surface of the dielectric layer and the reflection on the electrically conductive layer 2, the height of the interference air gap is set to an integral multiple of a half of the wavelength of the color. If a light of a certain color is desired to destructively interfere by the reflection on the upper surface of the dielectric layer and the reflection on the electrically conductive layer 2, the height of the interference air gap is set to the sum of an integral multiple of the half wavelength of the color and a quarter of that wavelength. It should be understood that in order to apply different principles, the height of the interference air gap can be set correspondingly. In an embodiment, to achieve constructive interference of light of a certain sub-pixel color, the height of the interference air gap 14 is $$\frac{1}{2}n\lambda,$$

where λ is the wavelength of the sub-pixel color and n is a positive integer. For example, in a pixel structure, the height of the interference air gap 14 corresponding to the sub-pixel configured to emit red light is $$\frac{1}{2}n\lambda_r,$$

where $\lambda_r$ represents the wavelength of the red light. When the sub-pixel is in the on-state, the movable shield 3 is movable along a surface parallel to the extending direction of the fixed substrate 1. The extending direction is the horizontal direction in FIG. 3. In the art, the length in the extending direction is much larger than the length in the stacking direction (i.e., the height). The movement of the movable shield 3 can change the amount of incident light A irradiating the electrically conductive layer 2, thereby changing the intensity of the emitted light generated by the sub-pixel through the interference, and thereby changing the gray level of the sub-pixel. A pixel voltage can be applied between the electrically conductive film 12 and the electrically conductive layer 2. In an embodiment, when the pixel voltage is in the off-state, an interference air gap 14 is formed between the electrically conductive layer 2 and the dielectric layer 13. In this situation, the subpixel structure is turned on. When the pixel voltage is in the on-state, the interference air gap 14 disappears. In this situation, the subpixel structure is turned off.

The electrically conductive film 12 is a partially reflective electrically conductive material, and the dielectric layer 13 is a transparent non-conductive material. FIG. 3 schematically shows the optical path of the sub-pixel. In FIG. 3, the movable shield 3 of the intermediate sub-pixel partially blocks the incident light, so that a portion of the incident light can irradiate the electrically conductive layer 2. The incident light A is incident from a side of the transparent substrate 11, and then passes through the transparent substrate 11, the electrically conductive film 12, and the dielectric layer 13. If the pixel voltage is turned off (i.e. disconnected), an interference air gap will exist between the electrically conductive layer 2 and the dielectric layer 13. In that situation, the incident light A continues to pass through the interference air gap 14 and reflects on the light incident side of the electrically conductive layer 2 facing the fixed substrate. The incident light A and the reflected light B undergo the constructive interference and the destructive interference by means of the interference air gap 14. Since the height of the interference air gap 14 in the direction perpendicular to the fixed substrate 1 is $$\frac{1}{2}n\lambda$$

(where λ is the wavelength of the incident light A), the reflected light B interferes constructively with the incident light A to form the constructive interference light. The constructive interference light passes through the dielectric layer 13, the electrically conductive film 12, and the transparent substrate 11, and is emitted from a side of the transparent substrate 11 away from the electrically conductive layer 2 to form the emitted light C having a wavelength of λ. The destructive interference light is absorbed by layers such as the dielectric layer 13, the electrically conductive film 12, and the transparent substrate 11. In that situation, the color and brightness of the sub-pixel which is turned on are affected by the wavelength and brightness of the incident light A and are related to factors such as the height of the interference air gap 14.

When the movable shield 3 moves in the plane parallel to the fixed substrate 1, it can change the amount of the incident light A irradiating the electrically conductive layer 2, thereby changing the intensity of the exiting light C, and thereby causing the changes of the gray level of the sub-pixel. The pixel structure of the present disclosure can change the gray level of the sub-pixel by the movement of the movable shield 3. The pixel structure according to an embodiment of the present disclosure reduces the difficulty of fabricating a plurality of addressable units of different sizes, as compared to the common spatial gray level modulation scheme and the common mixed spatial and temporal modulation scheme.

In an embodiment, the movable shield 3 may be a total reflective mirror.

When the incident light A is incident from a side of the transparent substrate 11, if the electrically conductive film 12 and the electrically conductive layer 2 are in the on-state, the electrically conductive layer 2 is subjected to electrostatic attraction, and the interference air gap 14 disappears, so the incident light A cannot form the emitted light C of the constructive interference. In this situation, the sub-pixel is in the off-state.

FIG. 3 also illustrates the structure of an embodiment of the electrically conductive layer 2. As shown in FIG. 3, the electrically conductive layer 2 comprises a flexible reflective film 22 and a rigid layer 21. The flexible reflective film 22 and the dielectric layer 13 form an interference air gap 14 in response to the pixel voltage. The rigid layer 21 is configured to define the height of the interference air gap 14 in a direction perpendicular to the fixed substrate. The rigid layer 21 is disposed on a side of the flexible reflective film 22 away from the dielectric layer 13, that is, the flexible reflective film 22 is located between the dielectric layer 13 and the rigid layer 21. The pixel voltage is applied between the flexible reflective film 22 and the electrically conductive film 12. When the pixel voltages between the electrically conductive film 12 and the flexible reflective film 22 is turned off, the flexible reflective film 22 abuts against the rigid layer 21 to define the interference air gap 14 together with the dielectric layer 13. When the pixel voltage between the electrically conductive film 12 and the flexible reflective film 22 is turned on, the flexible reflective film 22 is adsorbed on the dielectric layer 13. Since the rigid layer 21 limits the height of the interference air gap 14, the shape of the flexible reflective film 22 is prevented from being unstable to affect the accuracy of the height of the interference air gap 14, and therefore ensures the accuracy and the stability of the height of the interference air gap 14. In addition, by providing a rigid layer 21 with different heights in a single pixel structure, the interference air gaps 14 of different heights can be obtained to form the emitted light C of different colors, thereby producing a color display effect.

Figure 4:
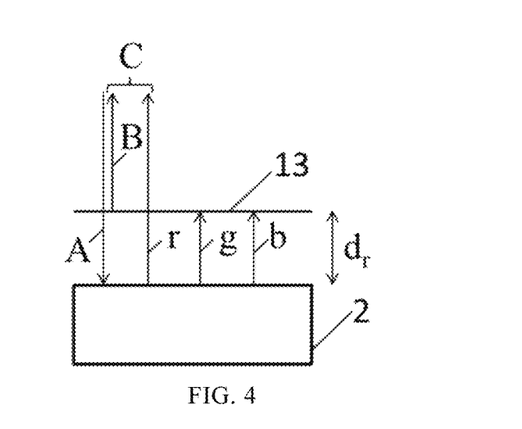
FIG. 4 schematically illustrates the principle of generating red light by an interference air gap of a given height in accordance with an embodiment of the present disclosure.
Figure 5:
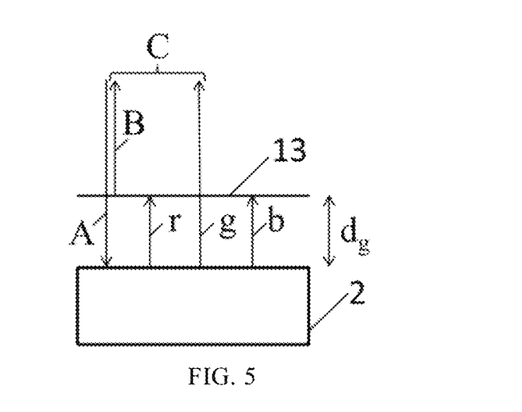
FIG. 5 schematically illustrates the principle of generating green light by an interference air gap of a given height in accordance with an embodiment of the present disclosure.
Figure 6:
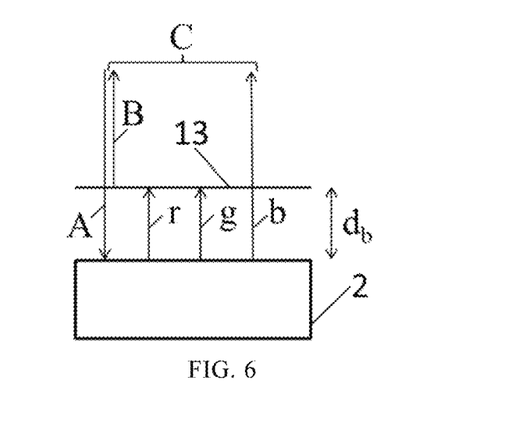
FIG. 6 schematically illustrates the principle of generating blue light by an interference air gap of a given height in accordance with an embodiment of the present disclosure.

FIG. 4 to FIG. 6 schematically illustrate the principle of changing the color of the exiting light of the pixel structure by adjusting the height of the interference air gap of the sub-pixel. In an embodiment, three sub-pixels may be included in one pixel structure. Each sub-pixel includes one interference air gap. As shown in FIG. 4 to FIG. 6, in one pixel structure, the heights of the three interference air gaps 14 between the electrically conductive layer 2 and the dielectric layer 13 can be preset to $d_r$, $d_g$, and $d_b$, respectively, where $$d_r = \frac{1}{2} n_1 \lambda_1, \ d_g = \frac{1}{2} n_2 \lambda_2, \ d_b = \frac{1}{2} n_3 \lambda_3,$$

where $\lambda_1$ is the wavelength of red light, $\lambda_2$ is the wavelength of green light, and $\lambda_3$ is the wavelength of blue light, and $n_1$, $n_2$, and $n_3$ are positive integers. The structures of FIG. 4-FIG. 6, that is, the three pixel sub-units in FIG. 3 can respectively emit red light, green light, and blue light. After the lights of three colors are combined according to respectively different intensities, a plurality of colors can be obtained to form a color display.

Three interference air gaps 14 can be formed between the electrically conductive layer 2 and the dielectric layer 13 in the pixel structure provided by the embodiments of the present disclosure. The heights of each of the interference air gaps 14 are different, so that the three sub-pixels display three different colors, and thus a plurality of colors can be generated by adjusting the intensity of lights of each sub-pixel. In an embodiment, the three sub-pixels emit red, green, and blue light, respectively. In other embodiments, the three sub-pixels can be other colors as appropriate.

By arranging a plurality of the pixel structures according to a certain order, an array substrate may be formed. The present disclosure further proposes an array substrate comprising the pixel structure. In an embodiment, the pixel structure may be a pixel structure that displays a single color. That is, the pixel structure comprises only one sub-pixel. In another embodiment, the pixel structure is composed of a plurality of sub-pixels of a single color, and the pixel structure can display a plurality of colors.

To ensure the purity of the emitted light C, an absorbing layer 121 may be disposed on a side of the electrically conductive film 12 away from the transparent substrate 11 to absorb the non-structural interference light. The absorbing layer 121 may be a translucent metal or semiconductor layer, such as one of materials including chromium, molybdenum, titanium, silicon, germanium, tungsten, and the like. The absorbing layer 121 may also be a material in which the product of the refractive index (H) and the extinction coefficient (K) is not zero. The absorbing layer 121 may have a thickness between 10 Å and 400 Å.

The amount of the transmitted light and the reflected light depends on the transmittance, the refractive index and the reflectance of the material forming the interference air gap 14 and the surrounding medium, and the like. In order to allow as much incident light A as possible to penetrate the electrically conductive film 12, as shown in FIG. 3, an antireflective coating 122 is disposed on the side of the electrically conductive film 12 near the transparent substrate 11, and an absorbing layer 121 is disposed on the side away from the transparent substrate 11. The antireflective coating 122 can be a silicon oxide or silicon nitride layer. The antireflective coating 122 may reduce the reflection loss of the incident light, therefore increasing the amount of incident light to ensure the intensity of the emitted light C. The antireflective coating 122 may also be used as a passivation layer to protect the internal absorbing layer 121. The antireflective coating 122 may have a thickness of 200 Å to 1000 Å.

In the pixel structure shown in FIG. 3, the shape of the interference air gap 14 is approximately trapezoidal. The upper base and the waist of the trapezoid are formed by the flexible reflective film 22, and the lower base of the trapezoid is formed by the dielectric layer 13. The flexible reflective film 22 and the dielectric layer 13 together form a sealed or approximately sealed interference space. The sealed space may reduce the light loss and may also avoid the light interference between the plurality of sub-pixel structures. The height of the interference air gap 14 in a direction perpendicular to the fixed substrate is an integral multiple of a half wavelength of the preset emitted light C of the sub-pixel. Considering the microelectromechanical processing and accuracy, the height of the interference air gap 14 can range from 450 Å to 1600 Å.

In the pixel structure of the embodiment of the present disclosure, in order to make the pixel structure having the ON and OFF states, the flexible reflective film 22 is variable to form the interference air gap 14. In the embodiment shown in FIG. 3, in order to keep the height of the interference air gap 14 stable, when the sub-pixel is turned on, the upper bottom and the waist of the trapezoidal interference air gap 14 abut against the rigid layer 21. Therefore, the light incident side of the rigid layer 21 defines the specific shape, in particular the height, of the interference air gap 14. It should be understood that when a pixel structure includes a plurality of sub-pixels, the electrically conductive layer 2 may comprises a plurality of segments. These segments can be connected together as shown in FIG. 3. In this situation, a plurality of segments share one potential, and the electrically conductive film corresponding to each of the segments has an independent potential, so that the pixel voltage of each sub-pixel is independently adjustable. In other embodiments, the segments of the electrically conductive layer may be disconnected from each other. At this time, the electrically conductive films may be electrically connected to share a potential, and the potential of each segment of the electrically conductive layer is independently controlled. Apparently, both the electrically conductive layer and the electrically conductive film can be disconnected in accordance with the sub-pixel. In embodiments where the segments of the electrically conductive layer are connected together, the electrically conductive layer used to connect the various segments is referred to as a connection part. In an embodiment, the connecting portion directly abuts against the dielectric layer 13, thereby ensuring the stability of the height of the interference air gap 14. The wording "abut" refers to contact with and causes some pressure to other components.

According to embodiments of the above pixel structures, the present disclosure further provides a method for driving a pixel structure. The pixel structure comprises a fixed substrate, an electrically conductive layer disposed at a side of the fixed substrate, and a movable shield disposed on another side of the fixed substrate. The fixed substrate comprises a transparent substrate, an electrically conductive film on the transparent substrate, and a dielectric layer surrounding the electrically conductive film. The electrically conductive layer is at a side of the electrically conductive film away from the transparent substrate. The electrically conductive layer and the dielectric layer are configured to form an interference air gap in response to the pixel voltage. The height of the interference air gap in a direction perpendicular to the fixed substrate is $$\frac{1}{2}n\lambda,$$

where λ is a wavelength corresponding to the color of the sub-pixel of pixel structure and n is a positive integer. The movable shield is configured to be movable in a plane parallel to the extending direction of the fixed substrate to change the amount of incident light irradiating the electrically conductive layer. The method specifically comprises the following steps:

the sub-pixel turning on step: disconnecting the pixel voltage between the electrically conductive film 12 and the electrically conductive layer 2, so that an interference air gap 14 is formed between the electrically conductive layer 2 and the dielectric layer 13;

the tone adjustment step: driving the movable shield 3 to move the preset distance in a plane parallel to the extending direction of the fixed substrate to change the amount of an amount of incident light irradiating the electrically conductive layer 2.

When the sub-pixel is turned on, a portion of the incident light A is reflected on the upper surface of the dielectric layer 13, and the other portion passes through the interference air gap and is reflected at the electrically conductive layer 2. The light reflected at the upper surface of the dielectric layer 13 interferes with light reflected at the electrically conductive layer 2. Since the height of the interference air gap is $$\frac{1}{2}n\lambda,$$

the light has a wavelength of λ in the incident light interferes constructively to form the emitted light C. Light having a wavelength other than λ undergoes destructive interference and does not form light emitted from the sub-pixel. When the movable shield 3 is moved such that its orthographic projection on the fixed substrate coincides with the orthographic projection of the upper portion of the trapezoidal interference air gap, a portion of the incident light A originally incident on the electrically conductive layer 2 is blocked by the movable shield 3. Therefore, the movement of the movable shield 3 changes the amount of incident light A irradiating the electrically conductive layer 2 and the amount of reflected light, thereby changing the gray level of the emitted light C of the sub-pixel to achieve the purpose of controlling the color and brightness of the pixel structure.

The sequence of the tone adjustment step and the sub-pixel turning on step is not limited. For example, the position of the movable shield 3 can be adjusted before the sub-pixel is turned on, and the position of the movable shield 3 can be adjusted after the sub-pixel is turned on. The two steps can also be performed simultaneously, which does not affect the implementation of the present disclosure.

In another embodiment of the method for driving a pixel structure of the present disclosure, the method further comprises:

sub-pixel turning off step: applying a pixel voltage between the electrically conductive film 12 and the electrically conductive layer 2, so that the electrically conductive layer 2 is adsorbed on the dielectric layer 13, the interference air gap 14 disappears, and the sub-pixel is turned off.

Since the electrically conductive layer 2 comprises the flexible reflective film 22 and a rigid layer 21, when the pixel voltage is applied between the electrically conductive film 12 and the flexible reflective film 22, the flexible reflective film 22 is adsorbed on the dielectric layer 13, the interference air gap 14 disappears, and the sub-pixel is turned off.

The sequence and duration of the sub-pixel turning off step, the sub-pixel turning on step, and the tone adjustment step may be specifically adjusted according to actual display conditions. For example, if the sub-pixel is required to be maintained in a constant lighting status, the sub-pixel is kept turning on; if the sub-pixel is required to be in the monochrome blinking state, the sub-pixel turning off step and the sub-pixel turning on step are alternately performed; if sub-pixel is required to be in the monochrome tone variation status, the tone adjustment state is implemented to achieve different display effects.

In another specific embodiment, before the tone adjustment step, the method further comprises: acquiring an ambient light signal. In this situation, the tone adjustment step specifically becomes: driving the movable shield 3 to move the preset distance according to the ambient light signal, to change the amount of incident light irradiating the electrically conductive layer 2.

In this embodiment, the ambient light signal can be obtained by a light-sensitive device, and the position of the movable shield 3 can be adjusted according to the ambient light signal, so that the gray level of the sub-pixel matches with the ambient light. For example, under the sunlight, a light-sensitive device senses a relatively strong ambient light signal. After the controller obtaining the light signal, the corresponding driving voltage is adjusted and the movable shield 3 is driven according to the intensity of the light signal, so that the overlapping degree of the orthographic projection of the movable shield 3 and the orthographic projection of the interference air gap 14 is relatively low. Thus, the effective reflective area of the electrically conductive layer 2 is relatively large, thereby enhancing the brightness of the sub-pixel display, and making image displayed by the sub-pixels more vivid and clear under the sunlight.

The incident light path of the incident light A may employ a known IMOD incident light path. The application and disconnection of the pixel voltage between the electrically conductive film 12 and the electrically conductive layer 2 can be controlled by a single chip microcomputer or a hardware circuit and will not be described herein.

The driving of the movable shield 3 in the embodiments of the present disclosure may be achieved by the pulling of the contact type microelectromechanical components, or by the non-contact type field force. In an embodiment of the drive structure of the movable shield 3, the movable shield 3 may be directly applied with a driving voltage electrical signal or be driven by other components, so that the movable shield 3 may move. The drive circuit that drives the movement of the movable shield 3 is separated from the pixel voltage circuit of the flexible reflective film 22. The movable shield 3 and the flexible reflective film 22 are driven independently.

Figure 7:
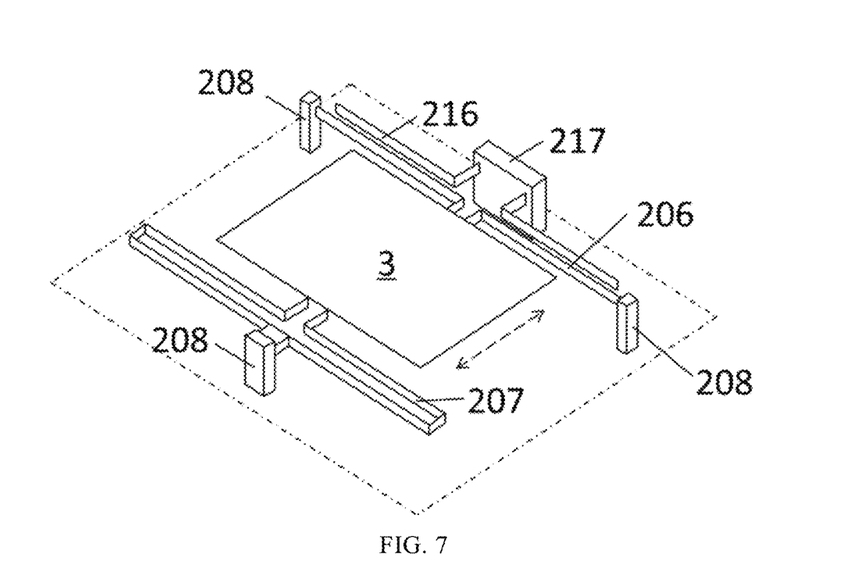
FIG. 7 schematically illustrates a schematic diagram of a driving structure of a movable shield according to an embodiment of the present disclosure.
Figure 8:
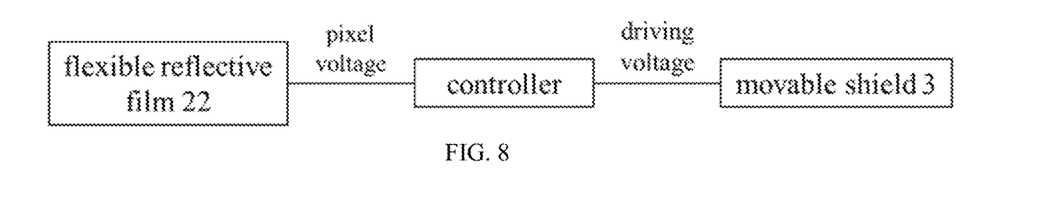
FIG. 8 schematically illustrates a connection relationship between a flexible reflective film and a movable shield and a controller according to an embodiment of the present disclosure.

In an embodiment, the present disclosure uses field force to implement the movement of the movable shield 3. FIG. 7 schematically illustrates an embodiment of a drive structure for driving the movable shield 3 in accordance with an embodiment of the present disclosure. An end of the movable shield 3 is a free end that can be attracted by an electric field force. The other end is a fixed end which is fixed to the support member 208 by an elastic member 207. The movement process of the movable shield 3 will be described below. A load member 206 that can be driven by the driving member 216 is provided at the free end. The load member 206 is connected to another support member 208. When a reverse driving voltage is applied between the load member 206 and the driving member 216, the driving member 216 generates an electrostatic attractive force to the load member 206, causing the load member 206 to move the movable shield 3, with the elastic member 207 gradually stores the elastic potential energy. When the driving voltage between the load member 206 and the driving member 216 are disconnected, the electrostatic attractive force disappears, and the elastic member 207 releases the elastic potential energy, so that the movable shield 3 moves in the reverse direction. The dotted arrow in FIG. 7 schematically shows the moving direction of the movable shield 3. It should be understood that this direction is merely a schematic representation and does not imply that the movable shield 3 can only move in this direction. Based on the properties of the elastic member 207, the electrostatic force between the driving member 216 and the load member 206, and the elastic force of the elastic member 207 can be designed such that the driving voltage between the driving member 216 and the load member 206 corresponds to the displacement of the elastic member 207 (i.e., the displacement of the movable shield 3). Therefore, the amount of incident light blocked by the movable shield 3 can be controlled by controlling the driving voltage. What can be preset is that, when the load member 206 and the driving member 216 are applied with the maximum reverse driving voltage, the displacement of the movable shield 3 is the largest, and the amount of the occluded light is the lowest. In this situation, the pixel structure is in a reflective display mode. When the driving voltage between the load member 206 and the driving member 216 are completely disconnected, the amount of the occluded light is the largest, and the effective reflection area of the flexible reflective film 22 is the smallest, which cannot form the reflective display mode. Apparently, the arrangement can also be reversed, that is, when the driving voltage is completely disconnected from the load member 206 and the driving member 216, the movable shield 3 blocks the incident light in the lowest degree, and the effective reflective area of the flexible reflective film 22 is the largest. When the maximum driving voltage is applied between the load member 206 and the driving member 216, the movable shield 3 blocks the incident light to the largest degree, and the effective reflective area of the flexible reflective film 22 is the lowest. When a portion of the driving voltage is applied between the load member 206 and the driving member 216, the effective reflective area of the flexible reflective film 22 is in an intermediate state. In this situation, the pixel structure is in a half-transmissive-half-reflective display mode. Further, the driving voltage of the driving member 216 may have a mathematical relationship or a corresponding relationship with the effective reflective area of the flexible reflective film 22. As shown in FIG. 8, a controller can control the driving voltage based on the intensity of the ambient light, thereby control the amount of the incident light blocked by the movable shield 3, thereby control the gray level of the sub-pixel. The controller may also be a controller that can output multiple signals, or a top or bottom single-chip microcomputer, for respectively outputting a driving voltage for driving the movable shield 3 to move and a pixel voltage for controlling the opening and closing of the pixel structure.

In the above embodiments of the array substrates, the fixed substrate 1 may be a light-transmissive material to allow the incident light A to pass through. A light-transmissive gap may be provided between the electrically conductive layers 2 of the sub-pixel structures. When the pixel is turned on, the light formed by the reflection of the incident light A on the upper surface of the dielectric layer 13 interferes constructively with the light formed by the reflection of the incident light A on the electrically conductive layer 2, to form a specific pixel color. In the reflective display mode, when the pixel structures in multiple rows and columns are turned on or partially turned on, a specific image is displayed on the array substrate. When the pixel structure is turned off, the incident light A cannot form the constructively interfering light. Since there is a light-transmissive gap between the electrically conductive layers 2 of the sub-pixel structures, part of the incident light A passes through the light-transmissive gap between the electrically conductive layers 2, so that a user can see the situation behind the fixed substrate 1. In this situation, the array substrate is in the transmissive display mode. By controlling the position of the movable shield 3 to adjust the amount of incident light so that the display intensity is weakened, the entire array substrate can be adjusted to a half-transmissive-half-reflective display mode. In addition, a portion of pixel structures in the array substrate can be adjusted to the reflective display mode, and another portion of the pixel structures can be adjusted to the transmissive display mode, so that part of the entire array substrate is in the reflective display mode and part is in the transmissive display mode.

Based on the above array substrate, the present disclosure further provides a display device comprising the array substrates of any of the foregoing embodiments. The display device may be a display component, such as a component of a display module, or be a display panel, such as a micro display screen, or be a device or product with a display component or a display panel, such as a refrigerator, a television, a mobile phone, or the like.

Figure 9:
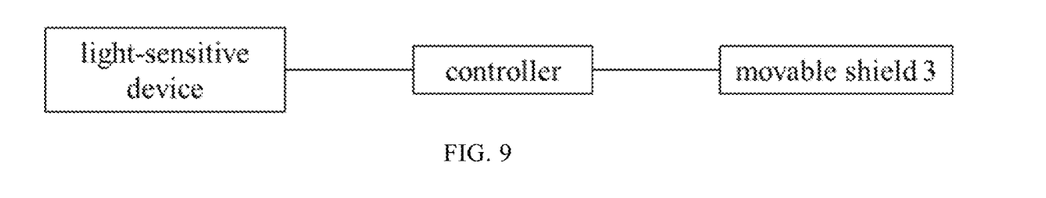
FIG. 9 schematically illustrates a connection relationship between a light-sensitive device and a movable shield and a controller according to an embodiment of the present disclosure.

As shown in FIG. 9, the display device may further comprise a light-sensitive device and a controller that can receive the sensing signal of the light-sensitive device. The controller can control the movable shield 3 to move the preset distance based on the sensing signal sent by the light-sensitive device, to adjust the display device into the reflective display mode, the transmissive display mode or the half-transmissive-half-reflective display mode, because the fixed substrate 1 is a light-transmissive material, a light-transmissive gap is provided between the electrically conductive layers 2 of pixel structures, and the controller is electrically connected to the light-sensitive device and the movable shield 3, respectively.

The present disclosure provides a pixel structure, a method for driving a pixel structure, an array substrate, and a display device. The display device uses a light-sensitive device to adjust it into a reflective display mode, a half-transmissive-half-reflective display mode, or a transmissive display mode according to an ambient light environment or according to other control commands. In accordance with the present disclosure, various display modes are also free to switch to increase the range of applications of the various products of the present disclosure. For example, the display device of the present disclosure can be applied to a refrigerator having a switchable display mode. The display device of the present disclosure is provided on a certain part of the refrigerator. When it is not necessary to see the inside of the refrigerator, the display device on the refrigerator can be adjusted into the reflective display mode to display a picture, a video or other content. When it is needed to see the items inside the refrigerator, the display device can be adjusted into a transmissive display mode, so that the inside of the refrigerator can be seen without opening the door of the refrigerator. This improves the situation that a related refrigerator with a transparent door or transparent window cannot obscure the mess inside the refrigerator when needed.

The movable shield in the pixel structure of the present disclosure can change the amount of incident light irradiating the electrically conductive layer while moving, thereby changing the gray level of the sub-pixel. Compared with the related spatial gray-level modulation method and the related spatial and temporal mixing modulation method, the difficulty of manufacturing many addressable units with different sizes is decreased. The pixel structure of the present disclosure can also be combined with associated gray level modulation to achieve a finer gray level range.

The height of the interference air gap between the flexible reflective film and the dielectric layer in the pixel structure of the present disclosure can be adjusted, such that the sub-pixel enters an on or off state. The color of the light emitted by the pixel can be set according to the heights of the air gaps to achieve the purpose of color display. Multiple sub-pixels can be integrated in a single pixel structure, that is, one pixel structure including multiple interference air gaps of different heights. The sub-pixel displays different colors such as red, green, and blue to achieve color display.

The movable shield in the pixel structure of the present disclosure can be driven by an electric field force to change the amount of the incident light irradiating the electrically conductive layer.

The fixed substrate in the pixel structure of the present disclosure may be a light-transmissive material. In this situation, the display device using the array substrate of the present disclosure can be turned off and adjusted into the transmissive display mode when the image is not required to be displayed, so as to see the structure or items behind it through the display device. When the image needs to be displayed, the pixel structure forms constructive interference light by the interference air gap and adjusts the array substrate into the reflective display mode. In addition, some positions in the array substrate can be adjusted into the transmissive display mode, and some positions can be adjusted into reflective display mode, or the entire array substrate can be adjusted to half-transmissive-half-reflective display mode, which is beautiful and practical.

The above is only some of the embodiments of the present disclosure. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

I claim:

1. A pixel structure, comprising:
a fixed substrate,
an electrically conductive layer at a side of the fixed substrate,
a movable shield at another side of the fixed substrate, and
an electrically conductive film,
wherein the fixed substrate comprises:
 a transparent substrate, and
 a dielectric layer;
wherein the electrically conductive layer and the dielectric layer are configured to form one or more interference air gaps according to a pixel voltage applied between the electrically conductive layer and the electrically conductive film,
wherein the movable shield is configured to change an amount of incident light irradiating the electrically conductive layer, and
wherein an antireflective coating and an absorbing layer are disposed in parallel in the dielectric layer, and the absorbing layer is closer to the electrically conductive layer than the antireflective coating.

2. The pixel structure of claim 1 wherein the electrically conductive film is between the electrically conductive layer and the transparent substrate, and the dielectric layer at least partially surrounds the electrically conductive film.

3. The pixel structure of claim 1, wherein a height of the interference air gap in a direction perpendicular to the fixed substrate is $$\frac{1}{2}n\lambda,$$

wherein $\lambda$, is a wavelength corresponding to a color of a sub-pixel of the pixel structure and n is a positive integer.

4. The pixel structure of claim 1, wherein the movable shield is configured to change the amount of the incident light irradiating the electrically conductive layer by moving in a plane parallel to an extending direction of the fixed substrate.

5. The pixel structure of claim 4, further comprising a driving mechanism, wherein the driving mechanism comprises:
   a driving member, and
   an elastic member and a load member connected to the movable shield,
   wherein the driving mechanism is configured to drive the movable shield to move a preset distance in the plane parallel to the extending direction of the fixed substrate according to a driving voltage applied between the driving member and the load member.

6. The pixel structure according of claim 3, wherein the electrically conductive layer comprises a flexible reflective film and a rigid layer; and
   wherein the flexible reflective film and the dielectric layer are configured to form the interference air gap according to the pixel voltage, and the rigid layer is configured to define the height of the interference air gap in the direction perpendicular to the fixed substrate.

7. The pixel structure of claim 1, wherein the electrically conductive film is sandwiched between the absorbing layer and the antireflective coating.

8. The pixel structure of claim 1, wherein the one or more interference air gaps comprise three interference air gaps, and each of the interference air gaps has a different height in a direction perpendicular to the fixed substrate.

9. The pixel structure of claim 1 wherein the movable shield is a total reflective mirror.

10. The pixel structure of claim 1, wherein a material of the fixed substrate is a light-transmissive material.

11. An array substrate comprising the pixel structure of claim 1.

12. A display device comprising the array substrate of claim 11.

13. The display device of claim 12, further comprising
   a light-sensitive device configured to generate an ambient light signal, and
   a controller able to receive the ambient light signal,
   wherein the controller is configured to control the movable shield to change the amount of the incident light irradiating the electrically conductive layer according to the ambient light signal.

14. The display device of claim 13, wherein the movable shield is configured to enable the display device to enter a reflective display mode, a transmissive display mode or a half-transmissive-half-reflective display mode.

15. A method for driving a pixel structure, where the pixel structure comprises:
   a fixed substrate,
   an electrically conductive layer at a side of the fixed substrate,
   a movable shield at another side of the fixed substrate, and
   an electrically conductive film,
   wherein the fixed substrate comprises:
      a transparent substrate, and
      a dielectric layer,
   wherein the electrically conductive layer and the dielectric layer are configured to form one or more interference air gaps according to a pixel voltage applied between the electrically conductive layer and the electrically conductive film, and
   wherein the movable shield is configured to change an amount of incident light irradiating the electrically conductive layer;
   wherein the method comprises:
      disconnecting the pixel voltage such that the one or more interference air gaps are formed between the electrically conductive layer and the dielectric layer; and
      driving the movable shield to move a preset distance in a plane parallel to an extending direction of the fixed substrate to change the amount of the incident light irradiating the electrically conductive layer.

16. The method for driving the pixel structure of claim 15, further comprising:
   before the step of driving the movable shield to move the preset distance in the plane parallel to the extending direction of the fixed substrate to change the amount of the incident light irradiating the electrically conductive layer, obtaining an ambient light signal; and
   the step of driving the movable shield to move the preset distance in the plane parallel to the extending direction of the fixed substrate to change the amount of the incident light irradiating the electrically conductive layer comprises: driving the movable shield according to the ambient light signal to move the preset distance in the plane parallel to the extending direction of the fixed substrate to change the amount of the incident light irradiating the electrically conductive layer.

* * * * *